United States Patent

Krietsch et al.

(10) Patent No.: US 8,940,189 B2
(45) Date of Patent: Jan. 27, 2015

(54) INTENSELY COLOURED AND/OR OPTICALLY VARIABLE PIGMENTS HAVING AN ELECTRICALLY CONDUCTIVE CORE

(75) Inventors: Burkhard Krietsch, Dieburg (DE); Matthias Kuntz, Seeheim-Jugenheim (DE); Reinhold Rueger, Rodermark (DE)

(73) Assignee: Merck Patent GmbH, Darmstadt (DE)

( * ) Notice: Subject to any disclaimer, the term of this patent is extended or adjusted under 35 U.S.C. 154(b) by 939 days.

(21) Appl. No.: 12/809,290

(22) PCT Filed: Dec. 11, 2008

(86) PCT No.: PCT/EP2008/010529
§ 371 (c)(1),
(2), (4) Date: Jun. 18, 2010

(87) PCT Pub. No.: WO2009/077123
PCT Pub. Date: Jun. 25, 2009

(65) Prior Publication Data
US 2010/0270510 A1  Oct. 28, 2010

(30) Foreign Application Priority Data
Dec. 19, 2007 (DE) ................. 10 2007 061 693

(51) Int. Cl.
| H01B 1/00 | (2006.01) |
| C09C 1/00 | (2006.01) |
| C09D 5/24 | (2006.01) |
| C09D 5/36 | (2006.01) |
| C09D 7/12 | (2006.01) |
| C09D 11/037 | (2014.01) |
| C08K 3/22 | (2006.01) |
| C08K 9/02 | (2006.01) |

(52) U.S. Cl.
CPC ............ *C09C 1/0021* (2013.01); *C09C 1/0024* (2013.01); *C09D 5/24* (2013.01); *C09D 5/36* (2013.01); *C09D 7/1225* (2013.01); *C09D 7/1283* (2013.01); *C09D 11/037* (2013.01); *C01P 2006/40* (2013.01); *C08K 3/22* (2013.01); *C08K 9/02* (2013.01); *C09C 2200/1004* (2013.01)
USPC ........... 252/500; 106/417; 106/418; 106/430; 106/436; 427/58; 427/126.3; 427/212; 427/218; 428/403

(58) Field of Classification Search
USPC .................. 252/500; 106/430, 436, 418, 417; 428/403; 427/58, 126.3
See application file for complete search history.

(56) References Cited

U.S. PATENT DOCUMENTS

| 4,744,832 A * | 5/1988 | Franz et al. ................. 106/418 |
| 5,958,125 A * | 9/1999 | Schmid et al. ............. 106/417 |
| 5,972,098 A * | 10/1999 | Andes et al. ................ 106/436 |
| 6,238,472 B1 * | 5/2001 | Andes et al. ................ 106/430 |
| 6,767,633 B2 | 7/2004 | Steudel et al. |
| 7,604,862 B2 | 10/2009 | Ambrosius et al. |
| 2005/0013934 A1 * | 1/2005 | Xiong et al. .................. 427/212 |
| 2005/0253117 A1 * | 11/2005 | Pfaff et al. ..................... 252/500 |
| 2007/0015012 A1 | 1/2007 | Bujard et al. |
| 2007/0028799 A1 | 2/2007 | Kniess et al. |

FOREIGN PATENT DOCUMENTS

| WO | WO 93/08237 A1 | 4/1993 |
| WO | WO 01/077235 A1 | 10/2001 |
| WO | WO 03/006558 A2 | 1/2003 |
| WO | WO 2004/099319 A2 | 11/2004 |
| WO | WO 2006/131472 A2 | 12/2006 |
| WO | WO 2007/028798 A1 | 3/2007 |

OTHER PUBLICATIONS

International Search Report of PCT/EP2008/010529 (Jul. 31, 2009).

\* cited by examiner

*Primary Examiner* — Khanh Tuan Nguyen
(74) *Attorney, Agent, or Firm* — Millen, White, Zelano & Branigan, P.C.

(57) ABSTRACT

The present invention relates to intensely colored and/or optically variable pigments which have a flake-form transparent or semitransparent electrically conductive core and at least one coloring dielectric layer surrounding the core, to a process for the preparation of such pigments, and to the use thereof.

21 Claims, No Drawings

INTENSELY COLOURED AND/OR OPTICALLY VARIABLE PIGMENTS HAVING AN ELECTRICALLY CONDUCTIVE CORE

SUMMARY OF THE INVENTION

The present invention relates to intensely coloured and/or optically variable pigments which comprise a flake-form transparent or semitransparent electrically conductive core and at least one colouring dielectric layer surrounding the core, to a process for the preparation thereof, and to the use thereof.

Effect pigments have been playing an ever more important role in recent years when it comes to the industrial application of colorants or functional pigments. In general, either the desired colour or a desired technical function of the pigments used plays the crucial role in the choice of the pigments. Recently, more frequent attempts have also been made to combine functionality and colour of pigments with one another, with qualitative reductions either in the optical properties or in the functional properties of the pigments frequently having to be accepted.

Traditionally, colouring in industrial applications, such as inks, in particular printing inks, coatings, plastics, ceramic materials and the like, is frequently carried out using pearlescent pigments, which, besides desired colour effects, can produce, in particular, a high gloss effect, a subtle shimmer and weak colouring which varies depending on the angle. Since they are particularly miscible with other organic or inorganic colorants owing to their high transparency, many different industrial applications based on such mixtures are common.

Besides the classical pearlescent pigments comprising flake-form $TiO_2$, BiOCl, basic lead carbonate or proven metal oxide/mica pigments, many special effect pigments which have single- or multilayered coatings on substrates such as $Al_2O_3$, $SiO_2$ or glass flakes and whose colour is achieved essentially through interference effects have been introduced in recent years.

Particularly desired for a variety of potential applications are pigments which have high colour intensity (chroma) and/or colour properties which vary depending on the viewing angle (colour flop, optically variable behaviour). Such properties are obtainable with the above-mentioned pigment types if the substrates and the layers located thereon meet strict quality requirements, in particular with respect to smoothness and uniformity of the applied layers, low porosity of the coatings and high transparency of the layers at the same time as perfect matching of the individual layer thicknesses to one another.

Also known are functional pigments which are electrically conductive and come in useful, in particular, in industrial applications. These pigments either consist of electrically conductive materials or comprise the latter in a coating on a support material. The support materials here may adopt various forms.

For example, electrically conductive pigments based on transparent flake-form substrates, such as $(SbSn)O_2$-coated mica or mica which has a single- or multilayered dielectric coating and an outer $(SbSn)O_2$ layer on top, are known. For achieving electrical conductivity of the pigments, it is important that the layer of electrically conductive material is located on the surface of the pigments. Such pigments can, introduced into various application media, contribute to the formation of an electrically conductive coating, for example in plastic articles, floorcoverings and the like, and are commercially available (for example from Merck KGaA under the name Minatec® 31CM or Minatec® 30 CM). They are described, for example, in the patents DE 38 42 330, DE 42 37 990, EP 0 139 557, EP 0 359 569 and EP 0 743 654.

For certain areas of application, for example security products, such as banknotes, cheques, credit cards, passports, tickets and the like, however, pigments which are capable of reacting to introduction into electromagnetic fields or through excitation by high-frequency electromagnetic field, for example by microwaves, with similar signals to electrically conductive pigments in order to be able to carry out certain security checks are also necessary in some embodiments. Such pigments must, for example, cause a deflection of the field lines of an alternating electric field, but must not be electrically conductive per se since short-circuiting in the security product may otherwise occur on application of the electric field with a correspondingly high pigment concentration.

On the other hand, the optically variable pigments already mentioned above have frequently been employed in recent years, especially in security products, for generating security elements which can also be recognised by untrained observers without particular aids. Thus, for example, certain numbers or patterns, inter alia, which exhibit a first colour at a certain observation angle and a second colour at another observation angle are printed on.

If it is intended to accommodate a plurality of different visible and invisible security features on a security product in a small space, for example in an imprint, the pigment concentration rapidly becomes so high that the requisite viscosity of the printing ink can no longer be achieved or that the various pigments mutually overlap and thus obstruct one another in their efficacy. The mutual influence of the components frequently means that neither the colour nor the function of the security features can be set to the optimum. There is therefore a demand for pigments which simultaneously have as many of the desired properties as possible.

The object of the present invention was therefore to provide pigments which have readily visible and distinguishable attractive optical properties and at the same time are capable of generating or initiating a signal which is sufficiently strong for detection in the application medium on introduction thereof into an electromagnetic field or on excitation by high-frequency electromagnetic fields, without the formation of a short circuit in the application medium occurring at a relatively high use concentration of the pigment.

A further object of the invention was to provide a process for the preparation of the said pigments.

In addition, an object of the invention was to indicate the use of pigments of this type.

The object of the invention is achieved by intensely coloured and/or optically variable pigments which have a flake-form transparent or semitransparent electrically conductive core and at least one colouring dielectric layer surrounding the core.

In addition, the object of the invention is achieved by a process for the preparation of intensely coloured and/or optically variable pigments which comprises the following steps:
a) optionally coating of a flake-form transparent or semitransparent substrate with one or more dielectric layers,
b) coating of the substrate on both or all sides with an electrically conductive layer, giving an electrically conductive core,
c) coating of the electrically conductive core on all sides with at least one colouring dielectric layer.

The object of the invention is furthermore achieved by the use of the said pigments in paints, coatings, printing inks, plastics, security applications, films, formulations, ceramic materials, glasses, paper, for laser marking, for screening or attenuation of high-frequency electromagnetic radiation, for heat reflection, in dry preparations and pigment preparations.

The pigments according to the invention have a flake-form transparent or semitransparent electrically conductive core and at least one colouring dielectric layer surrounding the core.

For the purposes of the present invention, flake-form is regarded as being a sheet-like structure which has, with its top and bottom, two surfaces which are approximately parallel to one another and whose length and width dimensions represent the largest dimensions of the pigment. The separation between the said surfaces, which represents the thickness of the flake, has, by contrast, a smaller dimension.

The length and width dimensions of the pigments according to the invention are between 1 and 250 µm, preferably between 2 and 100 µm, and in particular between 5 and 60 µm. They also represent the value which is usually referred to as the particle size of the pigments. This is not critical per se, but a narrow particle-size distribution of the pigments is preferred. The thickness of the pigments is from 0.01 to 5 µm, preferably from 0.1 to 2 µm.

For the purposes of the present invention, the electrically conductive core is intended to be regarded as transparent if it essentially transmits visible light, i.e. to the extent of at least 90%. The electrically conductive core is regarded as semitransparent if it transmits at least 10%, but less than 90%, of visible light.

A layer is regarded as dielectric if it does not conduct electrical current.

For the purposes of the invention, a dielectric layer is regarded as colouring if it is crucially involved in determining the optical properties of the pigment through interference and/or inherent coloration, i.e. has its own optical activity. A layer of this type may be coloured (for example comprising a coloured metal compound) or colourless. In the latter case, the colourless layer has a layer thickness which is capable of making an independent contribution to the coloration of the pigment through the formation of interference effects.

The electrically conductive core has a transparent or semitransparent flake-form substrate and a coating located on all or both sides of the substrate, where the coating has a single- or multilayered structure and at least the outer layer of the coating represents an electrically conductive layer.

The term explanations used above for the terms flake-form, transparent and semitransparent likewise apply to the substrate. The substrate itself may either be electrically conductive or dielectric or preferably consists of a dielectric material. However, the substrate does not consist of a metallic material. For use as substrate, flake-form materials selected from the group consisting of synthetic or natural mica; other phyllosilicates, such as talc or kaolin, glass flakes, flake-form $SiO_2$, flake-form $Al_2O_3$, flake-form $TiO_2$ and/or synthetic $Fe_2O_3$ flakes are particularly suitable.

Mica, other phyllosilicates, glass flakes, flake-form $SiO_2$ and flake-form $Al_2O_3$ are particularly preferred here. Of these, mica is very particularly preferred.

The coating located on the substrate has a single- or multilayered structure. If it has a single-layered structure, it is a layer comprising an electrically conductive material, while in the case of a multilayered structure of the coating, at least the outer of these layers represents a layer comprising an electrically conductive material.

In the case of a multilayered structure, the first layer located directly on the substrate and optionally one or more subsequent layers may consist of a dielectric material. These layers may consist both of a high-refractive-index material and also of a low-refractive-index material and serve to screen the conductive layer from the substrate in order to prevent ion exchange, and/or to influence the colour of the pigment. Suitable materials are given below.

In a preferred embodiment of the present invention, the first layer located directly on the substrate consists of $SiO_2$ or silicon oxide hydrate and a subsequent second layer consists of an electrically conductive material. The first layer here may optionally also comprise further metal oxides, such as, for example, small amounts of aluminium oxide.

However, a further embodiment of the present invention; in which the electrically conductive layer is located directly on the substrate and thus forms an electrically conductive coating, is also preferred.

The electrically conductive layer and also any layers arranged directly on the substrate beneath the electrically conductive layer do not necessarily have to surround the substrate. For the preparation of the pigments according to the invention, it is sufficient for this layer or these layers to be formed on both sides of the substrate, i.e. to be located on the largest surfaces of the substrate. However, the embodiments in which at least the electrically conductive layer, but particularly preferably all layers located in the electrically conductive core, surround the substrate as completely as possible are preferred.

Suitable materials for the electrically conductive layer are, in particular, doped metal oxides, where the electrically conductive layer comprises one or more thereof. The metal oxides are preferably tin oxide, zinc oxide, indium oxide and/or titanium oxide, preferably tin oxide, indium oxide and/or zinc oxide. The said metal oxides are present in doped form in the conductive layer, where the doping may take place with gallium, aluminium, indium, thallium, germanium, tin, phosphorus, arsenic, antimony, selenium, tellurium, molybdenum, tungsten and/or fluorine. Individual dopants of those mentioned, but also combinations thereof, may be present in the conductive layer. Aluminium, indium, tellurium, fluorine, tungsten, tin and/or antimony are preferably employed for doping the metal oxides. The proportion of dopants in the conductive layer can be 0.1 to 30% by weight, it is preferably in the range from 2 to 15% by weight. In a particularly preferred embodiment, the conductive layer employed is antimony-doped tin oxide, antimony- and tellurium-doped tin oxide, tungsten-doped tin oxide, tin-doped indium oxide, aluminium-doped zinc oxide or fluorine-doped tin oxide, where antimony-doped tin oxide is particularly preferred. The tin to antimony ratio in this preferred combination can be 4:1 to 100:1, the ratio preferably being 8:1 to 50:1. Lower antimony contents adversely affect the conductivity, whereas higher antimony contents increase the absorption by the pigments in the visible wavelength region and reduce the transparency of the electrically conductive cores of the pigments according to the invention.

The proportion of the electrically conductive layer, based on the flake-form substrate, can be 20 to 120% by weight and is preferably 40 to 75% by weight.

The transparent or semitransparent substrate and the coating which is located on the substrate and has at least on its surface an outermost layer which is electrically conductive form the electrically conductive core of the pigment according to the invention.

This core is surrounded in accordance with the invention by at least one colouring dielectric layer.

This layer surrounding the core may be a layer comprising a material having a refractive index n≥1.8 or a layer comprising a material having a refractive index n<1.8. In the former case, this layer would be regarded as being of high refractive index, in the latter case as being of low refractive index.

Further dielectric layers, which are likewise of importance for the coloration of the pigment, may be located on this first layer.

Thus, an embodiment is preferred in which further layers which surround the respective underlying layer and alternately consist of a material having a refractive index $n<1.8$ and a material having a refractive index $n \geq 1.8$ are located on the first layer comprising a material having a refractive index $n \geq 1.8$. At least one of these layers, but preferably a plurality of these layers and very particularly preferably all of these layers contribute to the coloration of the pigment through interference and/or inherent colour. An embodiment having a total of three layers is preferred.

An embodiment is likewise preferred in which further layers which surround the respective underlying layer and alternately consist of a material having a refractive index $n \geq 1.8$ and a material having a refractive index $n<1.8$ are located on the first layer comprising a material having a refractive index $n<1.8$. In this embodiment too, at least one of these layers, but preferably a plurality of these layers and very particularly preferably all of these layers contributes to the coloration of the pigment through interference and/or inherent colour. Preference is given here to an embodiment having a total of two layers and a further embodiment having a total of four layers on the electrically conductive core. This means that a layer comprising a material having a refractive index $n \geq 1.8$ in each case forms the outermost layer of the pigment.

In this last-mentioned embodiment, it is not absolutely necessary for the first layer of low refractive index which is located directly on the electrically conductive core to make a significant contribution to the colour of the pigment, i.e. to have its own optical activity. This first layer may also serve as insulation layer here in order to separate the electrically conductive core and the further layer(s) lying above the first layer in such a way that ion exchange cannot take place between these layers during calcination of the pigment. In such a case, for example in the case of a first layer comprising $SiO_2$, a layer thickness of about 10 nm would be sufficient to be able to achieve an insulation function of this layer. However, if the layer thickness of this layer is greater than 10 nm, in particular greater than 20 nm and very particularly greater than 30 nm, the first layer of low refractive index also makes an independent contribution to the coloration of the pigment, which arises from the interference ability of this layer. If the first low-refractive-index layer is coloured, its proportion in the coloration of the pigment, is of course greater, even in the case of very small layer thicknesses, than the proportion of a colourless layer of the same thickness.

If the layer thickness of the first low-refractive-index layer is so small that it does not make an independent contribution to the colour of the pigment, at least one further high-refractive-index layer is also arranged on the first layer in every case, in which case this high-refractive-index layer and, where present, the further layers arranged on the high-refractive-index layer determine the colour of the pigment.

Whether the pigments according to the invention are intensely coloured or optically variable is essentially dependent on the number of layers located on the electrically conductive core and the layer thicknesses thereof. Thus, the capacity of the layers to form optical variability, i.e. a hue which varies depending on the viewing angle, increases with the number of layers. To this end, it is particularly advantageous if a low-refractive-index layer (for example comprising $SiO_2$) which is located between two high-refractive-index layers has a significant layer thickness of at least 30 nm, better at least 50 nm and in particular at least 80 nm. It is of course necessary, as is familiar to the person skilled in the art, that the layer thicknesses of all dielectric layers located on the electrically conductive core are matched to one another in such a way that certain colours are either enhanced or suppressed through a targeted interplay of the interference effects and/or the inherent colour of the layers. In this way, intensely coloured pigments without an optically variable behaviour can also be produced in a multilayered structure.

The layers comprising a material having a refractive index $n \geq 1.8$ are layers which preferably consist of $TiO_2$, titanium oxide hydrate, titanium sub-oxides, $Fe_2O_3$, FeOOH, $SnO_2$, ZnO, $ZrO_2$, $Ce_2O_3$, CoO, $CO_3O_4$, $V_2O_5$, $Cr_2O_3$ and/or mixed phases thereof. These materials are either colourless or have an inherent colour owing to inherent absorption. Especial preference is given to $TiO_2$, titanium oxide hydrate, $Fe_2O_3$, FeOOH and $SnO_2$. Particular preference is given to $TiO_2$ and titanium oxide hydrate. Since these have a particularly high refractive index owing to prior coating with tin oxide, mixed phases comprising tin oxide with $TiO_2$ and/or titanium oxide hydrate, which form in these cases from the small amounts of tin oxide and the subsequent layer of $TiO_2$ and/or titanium oxide hydrate, are also particularly preferred.

The layers comprising a material having a refractive index $n<1.8$ preferably consist of $SiO_2$, silicon oxide hydrate, $Al_2O_3$, aluminium oxide hydrate, mixed phases thereof or $MgF_2$. These layers may also have an inherent coloration due to incorporation of colorants into these materials. Particular preference is given to $SiO_2$ and/or silicon oxide hydrate.

The pigments according to the invention have intrinsic electrical conductivity without resulting in the formation of electrically conductive layers in the application medium, which is attributable to complete covering of the electrically conductive layer by a dielectric of adequate thickness. The percolation threshold in the application medium, i.e. the probability of a pigment distribution arising in which a cluster or channel of adjacent electrically conductive pigments which extends through the entire application medium forms and a coherent electrically conductive surface thus arises, thus drops towards zero, even at relatively high concentrations of the pigment according to the invention in the application medium.

Thus, if the pigments according to the invention are introduced into an application medium, a short circuit in the application medium will not occur even at a relatively high pigment concentration and on excitation of the pigments by an electromagnetic field. On the other hand, the electrical conductivity of the conductive layer in the pigments according to the invention is adequate, even at a layer thickness of 15 nm, in order to exhibit a similar behaviour in electromagnetic fields or in microwaves to electrically conductive pigments which are isolated from one another, i.e. are not in direct contact with one another.

On the other hand, the pigments according to the invention are intensely coloured and/or exhibit an optically variable behaviour, which enables their use for the pigmentation of application media of a wide variety of types. In order, besides the intrinsic electrical conductivity, to be able to achieve an optically interesting pigment appearance of this type, it is particularly important that the electrically conductive layer meets particular quality demands with respect to its homogeneity, particle size, flatness of the surface, etc. In order to achieve this, a particularly finely tuned preparation process is necessary.

The present invention therefore also relates to a process for the preparation of intensely coloured and/or optically variable pigments, comprising the following steps:

a) optionally coating of a flake-form transparent or semitransparent substrate with one or more dielectric layers,
b) coating of the substrate on both or all sides with an electrically conductive layer, giving an electrically conductive core,
c) coating of the electrically conductive core on all sides with at least one colouring dielectric layer.

Although it is possible to arrange the coating of the substrate in steps a) and/or b) in such a way that only the large surfaces of the substrate are each covered by the coating, for example by means of a CVD or PVD process, or if the substrate is produced with the coating in a belt process, preference is nevertheless given to processes in which the coating of the flake-form substrate in steps a), b), and/or c) is carried out by the sol-gel process or by wet-chemical methods from inorganic starting materials.

Due to the simplicity of the process and the good availability of starting materials, it is particularly preferred for the coating of the substrate in steps a), b) and/or c) to be carried out by wet-chemical methods from inorganic starting materials.

However, some peculiarities in this respect should be observed, in particular for process step b).

As already described above, the electrically conductive layer, in particular, has to satisfy some prerequisites in order to produce sufficiently high intrinsic conductivity of the pigments according to the invention, but at the same time also to form a good basis for the subsequent layer structure comprising dielectric layers, which have to be capable of interference.

A material which is frequently used for the preparation of electrically conductive pigments is antimony-doped tin oxide. However, it has now been found that although the usual wet-chemical methods for the production of layers of this type are able to achieve the desired electrical conductivity of the layer, the surface properties of such layers remain, however, well behind the requirements made of layers which are capable of interference with respect to homogeneity and smoothness of the layer. In particular, layers of this type exhibit coarse granularity, an inhomogeneous thickness distribution on the substrate and co-precipitate particles adhering to the surface. Layers of this type thus have greater haze and, after calcination, a grey inherent coloration, which impair the overall optical impression of the pigments. Thin layers, i.e. layers having an average thickness of less than 20 nm, may then be so inhomogeneous with high granularity that complete coverage of the substrate surface is no longer present.

It has now been found, surprisingly, in intensive investigations that the colouristic properties of the pigments can be significantly improved if the granularity of the electrically conductive layer, which is usually applied by precipitation by wet-chemical methods, is reduced and the formation of co-precipitates is suppressed.

Preference is therefore given in the present invention to a process in which the electrically conductive layer is carried out by wet-chemical methods from inorganic starting materials by deposition of a precipitate on the substrate, preventing the formation of a co-precipitate.

Although the effects of a co-precipitate can be compensated to a certain extent by separating off the pigment after coating with the electrically conductive layer, washing and optionally drying the pigment and subsequent complex re-dispersal and subsequent coating with further layers, a process of this type is, however, not economical and requires excessively complex equipment.

Surprisingly, it has now been managed to coat the optionally pre-coated substrate with a thin electrically conductive layer of antimony-doped tin oxide by wet-chemical methods in one process step in such a way that virtually no co-precipitation occurs and the particle sizes of the primary particles are sufficiently large to guarantee sufficiently high conductivity of the layer.

For this purpose, the pH of the pigment suspension must be set in a suitable manner during the coating with the electrically conductive layer. pH values of 1.4 to 2.5 have proven particularly preferred, pH values in the range from 1.6 to 2.1 are very particularly preferred.

Furthermore, the concentration of the starting materials plays a particular role. It has proven particularly advantageous for the concentration of the substrate to be coated and the concentration of the materials employed for the coating with the electrically conductive layer to be set in the range from 2 to 20% by weight, based on the solvent. A range from 5 to 15% by weight is particularly preferred here, with a specific surface area of the substrate of about 3 to 5 $m^2$ per gram.

This ensures that the precipitate formed deposits virtually completely on the substrate surface of the pigments with no co-precipitation, and a primary particle size of the primary particles which later results in sufficiently high intrinsic electrical conductivity of the pigment is achieved.

A high stirring speed has also proven advantageous. This also supports complete deposition of the primary particles formed on the substrates.

Fine adjustment of these parameters is readily possible for the person skilled in the art in the individual case, for example by a statistical experiment design by the method of Box-Behnken, described in Statistics for Experimenters, Whiley-Interscience, John Whiley and Sons, New York, 1978.

In step c), the electrically conductive core is surrounded by at least one colouring dielectric layer. In order to ensure reliable sheathing of the electrically conductive core, process step c) can be carried out either by the sol-gel process or by wet-chemical methods from inorganic starting materials. In particular if step b) is carried out in the said wet-chemical process, it is particularly advantageous also to carry out the coating with the colouring dielectric layer in process step c) by wet-chemical methods from inorganic starting materials.

All wet-chemical processes familiar to the person skilled in the art which are suitable for the coating of interference pigments are suitable for this purpose. These have been described, for example, in documents DE 14 67 468, DE 19 59 998, DE 20 09 566, DE 22 14 545, DE 22 15 191, DE 22 44 298, DE 23 13 331, DE 25 22 572, DE 31 37 808, DE 31 37 809, DE 31 51 355, DE 32 11 602 and DE 32 35 017.

Preference is also given to a process in which the electrically conductive core is provided in step c) with a layer system comprising a plurality of dielectric layers lying one above the other, each of which surrounds the underlying layer and which alternately consist of a material having a refractive index $n \geq 1.8$ and a material having a refractive index $n < 1.8$, where the first layer surrounding the conductive core may either consist of a material having a refractive index $n \geq 1.8$ or of a material having a refractive index $n < 1.8$, and the outermost layer of the pigment consists of a material having a refractive index $n \geq 1.8$.

It is preferred here for the (first or only) layer surrounding the electrically conductive core to consist of $TiO_2$ and/or titanium oxide hydrate, where $TiO_2$ may be in the anatase modification or in the rutile modification. The latter is particularly preferred.

However, preference is also, given to another embodiment of the present invention in which the first layer surrounding the electrically conductive core consists of $SiO_2$ and/or silicon oxide hydrate.

As already explained above, it is advantageous for the outermost (optically active, i.e. colour-determining) layer of the layer system to be applied to the electrically conductive core to be a high-refractive-index layer ($n \geq 1.8$).

As likewise already mentioned, preference is given to a process in which an electrically conductive layer comprising an antimony-doped tin oxide is applied.

The present invention also relates to the use of the pigments according to the invention described above in paints, coatings, printing inks, plastics, in security applications, films, formulations, ceramic materials, glasses, paper, for laser marking, for screening or attenuating high-frequency electromagnetic radiation, for heat reflection, in dry preparations or in pigment preparations.

Due to their high colour intensity and/or their optically variable colour behaviour, the pigments according to the invention are highly suitable, merely owing to their colour properties, for being employed for the pigmentation of application media of the above-mentioned type. They are employed here in the same way as conventional interference pigments. If the material employed for the electrically conductive layer is the antimony-doped tin oxide which is preferred in accordance with the invention, the pigments additionally have a certain hiding power, which distinguishes them from the usual interference pigments, which are virtually completely transparent.

On use of the pigments in surface coatings and inks, all areas of application known to the person skilled in the art are possible, such as, for example, powder coatings, automobile paints, printing inks for gravure, offset, screen, or flexographic printing, and surface coatings in outdoor applications. A multiplicity of binders, in particular water-soluble, but also solvent-containing types, for example based on acrylates, methacrylates, polyesters, polyurethanes, nitrocellulose, ethylcellulose, polyamide, polyvinyl butyrate, phenolic resins, maleic resins, starch or polyvinyl alcohol, is suitable for the preparation of printing inks. The surface coatings can be water- or solvent-based coatings, where the choice of coating constituents is subject to the general knowledge of the person skilled in the art.

The pigments according to the invention can likewise advantageously be employed in plastics and films. Suitable plastics here are all standard plastics, for example thermosets and thermoplastics. The pigments according to the invention are subjected to the same conditions here as conventional pearlescent or interference pigments. Peculiarities of the introduction into plastics are therefore described, for example, in R. Glausch, M. Kieser, R. Maisch, G. Pfaff, J. Weitzel, Perlglanzpigmente [Pearlescent Pigments], Curt Vincentz Verlag, 1996, 83 ff.

The pigments according to the invention are also suitable for the preparation of flowable pigment preparations and dry preparations which comprise one or more pigments according to the invention, optionally further pigments or colorants (see below), binders and optionally one or more additives. Dry preparations are also taken to mean preparations which comprise 0 to 8% by weight, preferably 2 to 8% by weight, in particular 3 to 6% by weight, of water and/or a solvent or solvent mixture. The dry preparations are preferably in the form of pearlets, pellets, granules, chips, sausages or briquettes and have particle sizes of about 0.2 to 80 mm.

However, the pigments according to the invention are also capable of exhibiting a similar behaviour to electrically conductive pigments which are isolated from one another, i.e. are not in direct contact with one another, in all application media which at least occasionally are subjected to the influence of electromagnetic fields or microwaves and the like.

These include, for example, the attenuation or also reflection of high-frequency electromagnetic fields and the specific modification of the electrical flow density in a dielectric coating in an electric field.

The latter is particularly advantageous for many security applications, in particular in security products which are often subjected to the influence of electromagnetic fields in order to check otherwise invisible security features. Here, the pigments according to the invention can serve, for example, for the deflection of field lines of an alternating electric field, by means of which a local increase in the electromagnetic field (a so-called hot spot) is obtained. With the aid of this hot spot, for example, electroluminescent substances can be caused to luminesce.

It is particularly important here, as already described above, that, although the pigments have intrinsic electrical conductivity, the pigment powder as such is, however, not electrically conductive.

It goes without saying that the pigments according to the invention can be employed in a wide variety of application media, if necessary as a mixture with further organic and/or inorganic colorants and/or electrically conductive materials. The mixing ratios here are not limited in any way so long as the pigment concentration in the medium is sufficiently high to achieve the desired optical and/or functional properties, but sufficiently low in order to avoid adversely affecting the requisite viscosity. They can be mixed in any ratio with commercially available additives, fillers and/or binder systems.

It furthermore goes without saying that the pigments according to the invention can be provided with a post-coating which is familiar to the person skilled in the art in order to make them more compatible for use in the respective application medium. The post-coatings here can be either organic or inorganic. If desired, both types of post-coating are also employed together. A post-coating of this type does not affect the optical properties of the pigments according to the invention and also does not restrict the intrinsic electrical property of the pigments.

The pigments according to the invention have high colour intensity (chroma) and/or an optically variable colour behaviour and are therefore suitable for many application media which require such colour properties. At the same time, however, they are intrinsically conductive, and are consequently capable of the generation or initiation of detectable signals in application media which are subjected to the influence of electromagnetic fields. Both properties prove to be particularly advantageous on use of the pigments according to the invention in security applications, where they can serve for the generation of both visible and invisible security features, of which the latter can be detected on introduction of the security products into an electromagnetic field. They can therefore be employed particularly advantageously in security applications for the generation of multiple security features.

The present invention will be explained below with reference to examples, which are intended to describe the invention, but not restrict it.

EXAMPLES

Example 1 (Comparative Example)

Preparation of a Conductive Pigment without a Dielectric Coating 100 g of ground and classified mica having an average particle size of 25 μm ($d_{50}$, measured by laser diffraction) are suspended in 1900 ml of deionised water, and the suspension is adjusted to a pH of 1.8 using hydrochloric acid. A mixture of 132.9 g of an aqueous $SnCl_4$ solution (50% by weight), 42 ml of HCl (37% by weight) and 28.3 g of an aqueous $SbCl_3$ solution (35% by weight) is metered in continuously with stirring at 75° C. The pH is kept constant by simultaneous regulated metered addition of sodium hydroxide solution. After the full amount of the solution has been added, the mixture is stirred at 75° C. for a further 30 min, subsequently cooled to room temperature with stirring, and the reaction mixture is adjusted to pH 3. The pigment obtained is filtered off via a suction filter, washed with water, dried at 140° C. and calcined at 750° C. for 30 min, giving 145 g of a pale-grey pigment powder. The Sn:Sb ratio in the coating is 85:15, the layer thickness of the conductive coating is about 25 nm.

Example 2 (Invention)

Preparation of a Golden Interference Pigment Having a Conductive Core 100 g of the pigment from Example 1 are suspended in 1500 ml of water. 362 g of a sodium water-glass solution are slowly metered in with vigorous stirring at 75° C. and pH 7.5. The $SiO_2$ content of the solution is about 13% by weight. The mixture is stirred for a further 1 hour and sedimented once in order to separate off fine fractions. The pH is then adjusted to 1.8 using hydrochloric acid, and 100 ml of an $SnCl_4$ solution in hydrochloric acid (2.2% by weight of $SnCl_4$) are slowly metered in with stirring at 75° C. A $TiCl_4$ solution (13% by weight of $TiCl_4$, calculated as $TiO_2$) is subsequently metered in until the pigment exhibits a gold-yellow interference colour. During this addition, the pH is held at pH 1.8 by addition of sodium hydroxy-ide solution. The mixture is subsequently stirred for a further 1 hour, and the suspension is adjusted to pH 5.

The pigment obtained is filtered off via a Büchner funnel, washed with water, the filter cake is dried at 140° C., and the pigment powder obtained is calcined at 750° C. for 30 min, giving a loose yellow pigment powder.

Testing of the Electrical Conductivity:

In order to measure the specific resistance of the pigments, an amount of in each case 0.5 g of pigment is compressed against a metal electrode using a metal stamp in an acrylic glass tube having a diameter of 2 cm with the aid of a weight of 10 kg. The electrical resistance R of the pigments compressed in this way is measured. The specific resistance ρ is obtained from the layer thickness L of the compressed pigment in accordance with the equation $$\rho = R * \pi * (d/2)^2 / L (ohm*cm)$$

Using this method, the following specific resistances of the pigments are obtained:
Pigment from Example 1: ρ=65 Ωcm
Pigment from Example 2 ρ>100 KΩcm
Testing of Microwave Absorption on Coating Films:

In each case, the pigments from Examples 1 and 2 and a comparative sample of Iriodin® 205 Rutile Brilliant Yellow (interference pigment without conductive layer, Merck KGaA) are dispersed in NC lacquer (6% of collodium and 6% of butyl acrylate-vinyl isobutyl ether copolymer in a solvent mixture). PET films are coated with the coating preparation. As a further comparative example, a film is coated with coating with no added pigment. The concentration of the pigments in the dry coating layer is 20% by weight, the layer thickness is in each case 50 μm.

The coating film which comprises the pigment according to Example 1 is grey-white and transparent. The coating film which comprises the pigment from Example 2 according to the invention exhibits an intensely golden interference colour when viewed from above, as does the film which comprises the comparative pigment Iriodin® 205 Rutile Brilliant Yellow. The comparative film with no added pigment is colourless and transparent.

The samples are measured using an Agilent frequency analyser, model E5072C, to which a microwave resonator measuring head is connected, at 3.5 gigahertz. The measuring head has a 0.5 mm gap, through which the coated film can be introduced into the electric field. The frequency, the intensity and the half-value width of the resonance signal are measured, in each case empty and with introduced sample. The power conduction and polarisability of the samples are determined from the attenuation and frequency shift of the microwave signal. Whereas the microwave signal is hardly attenuated at all in the case of the comparative films with NC lacquer without addition and with Iriodin® 205 Rutile Brilliant Yellow (without conductive layer), the loss in the case of the samples which comprise the pigments from Examples 1 and 2 is in each case more than 20 decibels.

The experiment shows that the intrinsic conductivity of the pigments is comparable with the conductivity of the pigment from Example 1 without a colouring dielectric coating, although no conductivity was found using the method of powder conductivity measurement. The experiment additionally shows that microwave absorption is a suitable method for the detection of the conductive layer in the gold-coloured interference pigment and thus for the differentiation of different samples. In addition, the experiment also shows that the pigments according to the invention are in principle suitable for attenuating high-frequency electromagnetic radiation.

The invention claimed is:

1. A pigment powder comprising a pigment comprising a flake-form transparent or semitransparent electrically conductive core and at least one coloring dielectric layer surrounding the electrically conductive core, wherein the electrically conductive core has a transparent or semitransparent flake-form substrate and a coating located on all or both sides of the substrate, where the coating has a single- or multilayered structure and at least the outer layer of the coating represents an electrically conductive layer comprising metal oxides doped with gallium, aluminium, indium, thallium, germanium, tin, phosphorus, arsenic, antimony, selenium, tellurium, molybdenum, tungsten and/or fluorine, said electrically conductive layer having a layer thickness of at least 15 nm, and wherein the transparent or semitransparent substrate is synthetic or natural mica, talc, kaolin, glass flakes, flake-form $SiO_2$ or flake-form $Al_2O_3$, and wherein said pigment powder is not electrically conductive.

2. The pigment Pigments according to claim 1, wherein the coloring dielectric layer surrounding the core is a layer comprising a material having a refractive index n≥1.8.

3. The pigment according to claim 2, further comprising additional coloring layers which surround the coloring dielectric layer and are alternately a material having a refractive index n<1.8 and a material having a refractive index n≥1.8; and are located on the layer comprising a material having a refractive index n≥1.8.

4. The pigment according to claim 2, wherein the layer comprising a material having a refractive index n≥1.8 is $TiO_2$, titanium oxide hydrate, titanium suboxides, $Fe_2O_3$, FeOOH, $SnO_2$, ZnO, $ZrO_2$, $Ce_2O_3$, CoO, $Co_3O_4$, $V_2O_5$, $Cr_2O_3$ and/or mixed phases thereof.

5. The pigment according to claim 1, wherein the coloring dielectric layer surrounding the core is a layer comprising a material having a refractive index n<1.8.

6. The pigment according to claim 5, further comprising additional coloring layers which surround the coloring dielectric layer and are alternately a material having a refractive index n≥1.8 and a material having a refractive index n<1.8; and are located on the layer comprising a material having a refractive index n<1.8.

7. The pigment according to claim 6, wherein a layer comprising a material having a refractive index n≥1.8 in each case forms the outermost layer of the pigment.

8. The pigment according to claim 5, wherein the layer comprising a material having a refractive index n<1.8 is $SiO_2$, silicon oxide hydrate, $Al_2O_3$, aluminium oxide hydrate, mixed phases thereof or $MgF_2$.

9. The pigment according to claim 1, wherein the metal oxide of the conductive layer is tin oxide, zinc oxide, indium oxide and/or titanium oxide.

10. The pigment according to claim 1, having intrinsic electrical conductivity.

11. A process for the preparation of intensely colored and/or optically variable pigments according to claim 1, comprising:
   a) optionally coating of a flake-form transparent or semitransparent substrate with one or more dielectric layers,
   b) coating of the substrate on both or all sides with an electrically conductive layer, giving an electrically conductive core,
   c) coating of the electrically conductive core on all sides with at least one coloring dielectric layer.

12. The process according to claim 11, wherein the coating of the flake-form substrate in a), b), and/or c) is carried out by a sol-gel process or by wet-chemical methods from inorganic starting materials.

13. The process according to claim 11, wherein the electrically conductive layer is produced by wet-chemical methods from inorganic starting materials by deposition of a precipitate on the substrate, preventing the formation of a co-precipitate.

14. The process according to claim 11, wherein in c), a layer system comprising a plurality of coloring dielectric layers lying one above the other, each of which surrounds the underlying layer and which alternately is a material having a refractive index n≥1.8 and a material having a refractive index n<1.8, is applied, where the first layer surrounding the conductive core may either be a material having a refractive index n≥1.8 or a material having a refractive index n<1.8, and the outermost layer of the pigment is a material having a refractive index n≥1.8.

15. The process according to claim 11, wherein the layer surrounding the electrically conductive core is $TiO_2$ and/or titanium oxide hydrate.

16. The process according to claim 11, wherein the layer surrounding the electrically conductive core is $SiO_2$ and/or silicon oxide hydrate.

17. The process according to claim 11, wherein the electrically conductive layer is an antimony-doped tin oxide.

18. In a material selected from paint, coating, printing ink, plastic, security product, film, formulation, ceramic material, glass, paper dry preparations, or pigment preparation, wherein in each case said material contains a pigment, the improvement wherein said pigment is according to claim 1.

19. A material according to claim 18, wherein the pigment is employed as a mixture with organic and/or inorganic colorants and/or electrically conductive materials.

20. A material according to claim 18, wherein the pigment is employed in security products which are subjected to the influence of an electromagnetic field.

21. A pigment powder consisting of a pigment consisting of a flake-form transparent or semitransparent electrically conductive core and at least one coloring dielectric layer surrounding the electrically conductive core, wherein the electrically conductive core has a transparent or semitransparent flake-form substrate and a coating located on all or both sides of the substrate, where the coating has a single- or multilayered structure and at least the outer layer of the coating represents an electrically conductive layer consisting of metal oxides doped with gallium, aluminium, indium, thallium, germanium, tin, phosphorus, arsenic, antimony, selenium, tellurium, molybdenum, tungsten and/or fluorine, said electrically conductive layer having a layer thickness of at least 15 nm, and wherein the transparent or semitransparent substrate is synthetic or natural mica, talc, kaolin, glass flakes, flake-form $SiO_2$ or flake-form $Al_2O_3$, wherein the pigment powder is not electrically conductive.

* * * * *